US011294440B2

(12) United States Patent
Lagnado et al.

(10) Patent No.: US 11,294,440 B2
(45) Date of Patent: Apr. 5, 2022

(54) PERIPHERAL DEVICE CONFIGURATIONS BY HOST SYSTEMS

(71) Applicant: HEWLETT-PACKARD DEVELOPMENT COMPANY, L.P., Spring, TX (US)

(72) Inventors: Isaac Lagnado, Spring, TX (US); Steven Petit, Spring, TX (US); Lee E. Leppo, Spring, TX (US); Jeffrey Kevin Jeansonne, Spring, TX (US); Roger D. Benson, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 106 days.

(21) Appl. No.: 16/641,904

(22) PCT Filed: Nov. 17, 2017

(86) PCT No.: PCT/US2017/062193
§ 371 (c)(1),
(2) Date: Feb. 25, 2020

(87) PCT Pub. No.: WO2019/099018
PCT Pub. Date: May 23, 2019

(65) Prior Publication Data
US 2021/0405718 A1   Dec. 30, 2021

(51) Int. Cl.
*G06F 1/26* (2006.01)
*G06F 13/10* (2006.01)

(52) U.S. Cl.
CPC ........... *G06F 1/266* (2013.01); *G06F 13/102* (2013.01)

(58) Field of Classification Search
CPC .............................. G06F 1/266; G06F 13/102
See application file for complete search history.

(56) References Cited

U.S. PATENT DOCUMENTS

| 6,167,472 | A  | 12/2000 | Mitra et al. |
| 6,671,748 | B1 | 12/2003 | Cole et al. |
| 6,738,834 | B1 | 5/2004  | Williams |
| 7,149,978 | B1 | 12/2006 | Maffezzoni |
| 7,287,257 | B2 | 10/2007 | Meza |

(Continued)

FOREIGN PATENT DOCUMENTS

WO    WO-2017119887 A1 *  7/2017 ............. H04L 67/34

OTHER PUBLICATIONS

Device Access API Proposal for Java ME 8, Jul. 14, 2013, http://docs.oracle.com/javame/config/oldc/opt-pkgs/api/daapi-jmee8/api/index.html.

*Primary Examiner* — Glenn A. Auve
(74) *Attorney, Agent, or Firm* — HPI Patent Department

(57) ABSTRACT

An apparatus including a host system is provided. The apparatus includes a peripheral device in communication with the host system. The apparatus also includes a programmable memory unit within the peripheral device. The programmable memory unit is to receive a configuration profile from the host system. The configuration profile is to re-configure as an embedded device. In addition, the apparatus includes a power delivery system to provide power to the programmable memory unit and to provide power to an accessory of the peripheral device separately. The power delivery system provides power to the programmable memory unit to allow re-configuration of the peripheral device as the embedded device.

15 Claims, 5 Drawing Sheets

(56) References Cited

U.S. PATENT DOCUMENTS

| | | |
|---|---|---|
| 7,704,147 B2 | 4/2010 | Quraishi |
| 8,824,963 B2 | 9/2014 | Hirsch |
| 2008/0086588 A1 | 4/2008 | Danilak et al. |
| 2010/0199290 A1 | 8/2010 | Kavanaugh |
| 2014/0337560 A1 | 11/2014 | Chun et al. |
| 2016/0380809 A1* | 12/2016 | Hou .................. H04L 63/0428 370/254 |

\* cited by examiner

PERIPHERAL DEVICE CONFIGURATIONS BY HOST SYSTEMS

BACKGROUND

As computing devices become more compact to improve portability, various functions are being moved from embedded devices on the host system to peripheral devices. Accordingly, these functions are being hosted external of the device using peripheral devices that can be used with many different computing devices. For example, a network interface is often removed from notebook computers such that a docking station or dongle can be connected via a port to provide network connectivity. Since the peripheral devices are separate from the host system, the peripheral devices are generally seen on a network as a separate device from the host system.

BRIEF DESCRIPTION OF THE DRAWINGS

Reference will now be made, by way of example only, to the accompanying drawings in which.

DETAILED DESCRIPTION

An increasing number of functions that have been traditionally hosted on computing devices are shifted toward peripheral devices. This allows for smaller computing devices that may use a combination of peripheral devices to achieve similar functionality. Since not all functionality is required at all times, a user may select which peripheral device to connect to the computing device.

In general, peripheral devices may be connected to any compatible computing device and may include a unique identifier, such as a media access control address. Accordingly, when the computing device uses the peripheral device to connect to a network or another device, the identity of the computing device is not broadcasted to the network. It is to be appreciated by a person of skill in the art that in some instances, the identity of the computing device, also referred to as a host system below, is desired to be broadcasted to the network. Accordingly, the peripheral device is to be configured to emulate the host system to external devices and presents an identifier, such as a media access control address, of the host system to the external devices.

Figure 1:
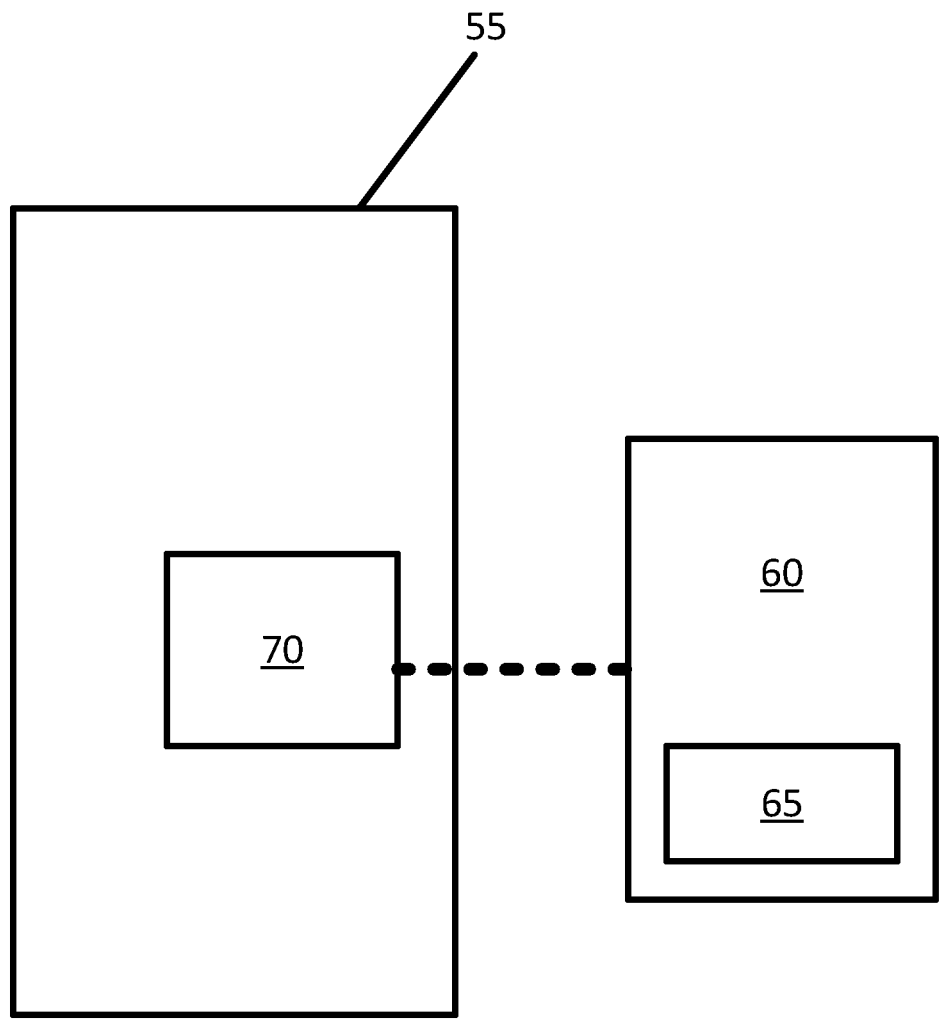
FIG. 1 is a block diagram of an example apparatus.
Figure 1:
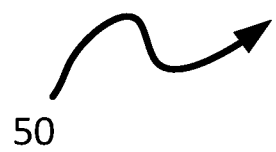

Referring to FIG. 1, an apparatus to have a peripheral device function as an embedded device is generally shown at 50. The apparatus 50 may include other components, such as various interfaces and input/output devices such as display touchscreens to interact with a user. In the present example, the apparatus 50 includes a host system 55, a peripheral device 60 with a programmable memory unit 65, and a power delivery system 70 capable to provide power separately to components within the peripheral device 60.

The host system 55 is not particularly limited and may be a mobile computing device, such as a laptop computer, a notebook computer, a tablet, a smartphone or a wearable device. The host system 55 may be generally a portable computing device configured to interact with a user. In order to save space within the host system 55, various systems may be removed from the host system 55. In the present example, the host system 55 does not include a network interface and antenna to communicate with a wireless network.

The peripheral device 60 is in communication with the host system 55 to provide a function for the host system 55. The manner by which the peripheral device 60 communicates with the host system is not limited. In the present example, the peripheral device 60 is connected to the host with a data connection such as a USB Type-C™ connection. In other examples, other data connections may be used such as a Thunderbolt™ bus, or a Bluetooth™ connection. The function provided by the peripheral device is not particularly limited. Continuing with the present example, the peripheral device 60 may be a wired network interface for connecting to a network, or a wireless network adaptor (also referred to herein as a network interface) with an antenna to allow the host system 55 to connect to a wireless network, such as a WIFI network (e.g. 802.11a, 802.11g, 802.11n, or 802.11ac), a cellular network (e.g. as fourth generation (4G), third generation (3G), code division multiple access (CDMA), Groupe Spécial Mobile (GSM) or Long Term Evolution (LTE) standards), BLUETOOTH™ or other non-standard radio signals. In other examples, the peripheral device 60 may be any other device, such as a memory storage device, such as a non-volatile memory storage (e.g. hard disk, floppy disk, optical disk, solid state drive, or tape drive), a video output system, such as a projector or screen or an audio output system.

Furthermore, the peripheral device 60 includes a default identifier, such as a media access control address, that is hardwired into the peripheral device 60. Accordingly, use of the peripheral device 60 without any configuration changes causes the peripheral device 60 to identify itself with the default identifier. It is to be appreciated that the default identifier of the peripheral device 60 is typically unique to the peripheral device 60 and may not be associated with the host system 55. Accordingly, the default identifier of the peripheral device 60 does not identify the host system 55 to other devices via a connection through the peripheral device 60.

In the present example, the peripheral device 60 includes a programmable memory unit 65 to store a configuration profile. In the present example, the programmable memory unit 65 is a non-volatile memory unit, such as Electrically Erasable Programmable Read Only Memory (EEPROM) or flash memory. The configuration profile may be used to re-configure the peripheral device 60 as an embedded device of the host system 55. The manner by which the peripheral device 60 is re-configured is not particularly limited. In the present example, the programmable memory unit 65 may include information received from the host system 55 to emulate an identifier of the host system 55, such as the media access control address of the host system. Accordingly, after the peripheral device 60 has been re-configured with configuration profile provided by the host system 55, the peripheral device 60 will identify itself with the identifier provided in the configuration profile instead of the default identifier. Therefore, the peripheral device 60 will expose itself on the network with the Media Access Controller identifier supplied by the host system 55, which allows the peripheral device 60 to be detected and identified on the network.

The configuration profile is not particularly limited and may include data to override default settings of the peripheral device 60. In the present example, the configuration profile includes an identifier of the host system 55, such as the media access control address. Other configurations may also be provided by the host system 55 such as enabling/ disabling peripheral ports or other features. When the default settings of the peripheral device 60 are overridden and bypassed, external devices do not see any information about the peripheral device 60 and instead view the apparatus 50 as the host system 55 with an embedded device, such as a network interface. In other examples, the default configurations may not be enabled, and instead allow the host system 55 to be configure the peripheral device 60 prior to allowing the peripheral device 60 to function, For example, if the host system 55 may configure a peripheral device 60 to disable the audio function on an attached dock such that the audio system does not operate during power up and override any default setting of the peripheral device 60 that may produce an audio output on power up.

The power delivery system 70 is to provide power to the components of the peripheral device 60. In the present example, the power delivery system 70 is to deliver power separately to an accessory of the peripheral device 60 and the programmable memory unit 65. The accessory is not particularly limited and may include any component of the peripheral device 60 or the entire peripheral device 60, which may also include the programmable memory unit 65. As shown in FIG. 1, the power delivery system 70 may provide power solely to the programmable memory unit 65.

The power delivery system 70 may be controlled by the host system 55 such that power may be selectively provided to an accessory of peripheral device 60 or to the programmable memory unit 65. In the present example, the power delivery system 70 may selectively provide power to the programmable memory unit 65 while not provide power to any other component of the peripheral device 60. When the power delivery system 70 provides power solely to the programmable memory unit 65, the programmable memory unit 65 may receive the configuration profile from the host system 55 while the peripheral device 60 remains in a non-powered state such that the peripheral device 60 does not interact with any other devices over the network. Therefore, the programmable memory unit 65 may re-configure the peripheral device 60 to bypass the default settings of the peripheral device 60 before any interactions with external devices.

Figure 2:
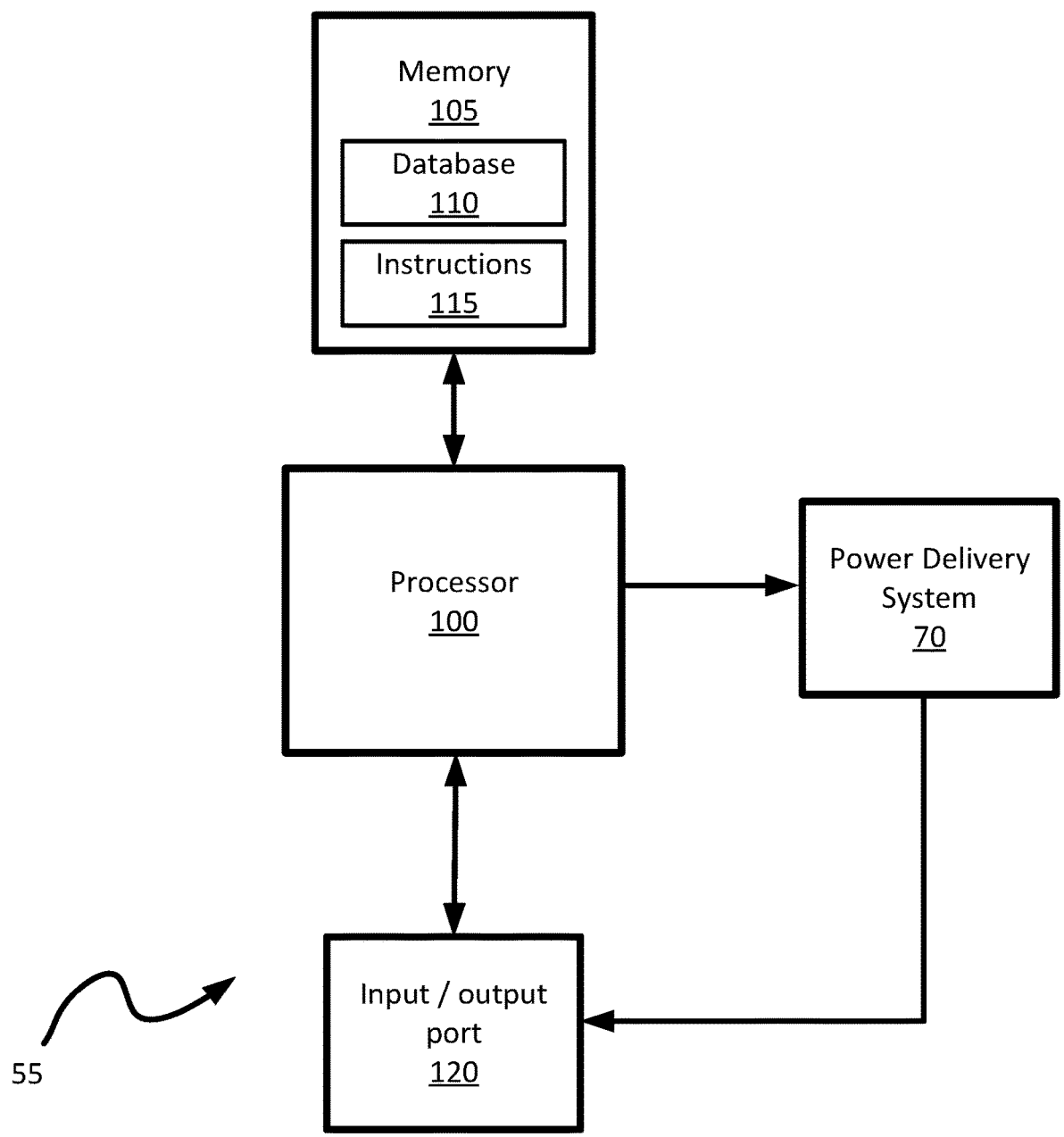
FIG. 2 is a block diagram of an example host system.

Referring to FIG. 2, an example of components of the host system 55 is shown in greater detail. In other examples, the host system 55 may include additional components, such as various additional interfaces and/or input/output devices such as displays to interact with a user. In the present example, the host system 55 includes the power delivery system 70, a processor 100, a memory 105, and an input/output port 120. The processor 100 may be to operate the host system 55 to carry out various functions typical of a computing device. The specific functions of the host system 55 may be dependent on an application of the host system.

The processor 100 may include a central processing unit (CPU), a microcontroller, a microprocessor, a processing core, a field-programmable gate array (FPGA), or similar. The processor 100 and memory 105 may cooperate to execute various instructions. In this example, the processor 100 may execute instructions stored in the memory 105 to perform functions of the host system 55 as well as to control the power delivery system 70. In particular, the processor 100 may execute instructions stored on the memory 105 to direct the power delivery system 70 to selectively power the programmable memory unit 65 or other components of the peripheral device 60. Continuing with the present example, the processor 100 may detect the presence of the peripheral device 60 as it is connected to the input/output port 120. The processor 100 may then direct the power delivery system 70 to provide power to the programmable memory unit 65 and leave the rest of the peripheral device 60 in a non-powered state.

The processor 100 is also to interact with the programmable memory unit 65 via the input/output port 120. Continuing with the present example where the peripheral device 60 may be a network interface, the processor 100 may send the configuration profile to the programmable memory unit 65 while the other components of the peripheral device 60 are not powered. When the configuration file may be completely stored in the programmable memory unit 65 and the programmable memory unit 65 has reconfigured the peripheral device 60 use identifiers in the configuration profile, the processor 100 may direct the power delivery system 70 to provide power to the more components of the peripheral device 60.

When the power delivery system 70 powers other components of the peripheral device 60, the processor 100 may send and receive messages over a network via the peripheral device 60 in the present example where the peripheral device 60 is a network interface. The manner by which the processor 100 communicates with the peripheral device 60 to access the network is not particularly limited. For example, the input/output port 120 may be a USB Type-C™ connector and the processor 100 may communicate with the peripheral device 60 with this standard. In other examples, other types of connectors may be used.

The memory 105 is coupled to the processor 100 and may include a non-transitory machine-readable storage medium that may be any electronic, magnetic, optical, or other physical storage device. In the present example, the memory 105 stores a database 110. The database 110 may include a plurality of configuration profiles for various peripheral devices. Accordingly, when the peripheral device 60 is connected to the host system 55, the default identifiers may be used to identify the specific peripheral device 60. The processor 100 may then select the configuration profile from the database 110 to send to the programmable memory unit 65 as described above.

The memory 105 may also store executable instructions 115. In the present example, the executable instructions 115 may include a set of instructions to detect carry out various functions of the host system 55 and to control the power deliver system 70. In addition, the instructions 115 may be used to direct the processor 100 to interact with the peripheral device 60.

The memory 105 may also store an operating system that is executable by the processor 100 to provide general functionality to the apparatus 50, for example, functionality to support various applications such as a user interface to access various features of the apparatus 50. Examples of operating systems include Windows™, macOS™, iOS™, Android™, Linux™, and Unix™. The memory 105 may additionally store applications that are executable by the processor 100 to provide specific functionality to the apparatus 50.

The input/output port 120 of the host system 55 is in communication with the processor 100. In addition, the power delivery system 70 provides power via the input/output port 120 to the programmable memory unit 65 in the present example. It is to be appreciated that in other examples, the power deliver system may be in direct communication with the peripheral device 60 via another connection instead of the input/output port 120. As mentioned above, in the present example, the input/output port is a USB Type-C™. In other examples, a different type of port may be used.

Figure 3:
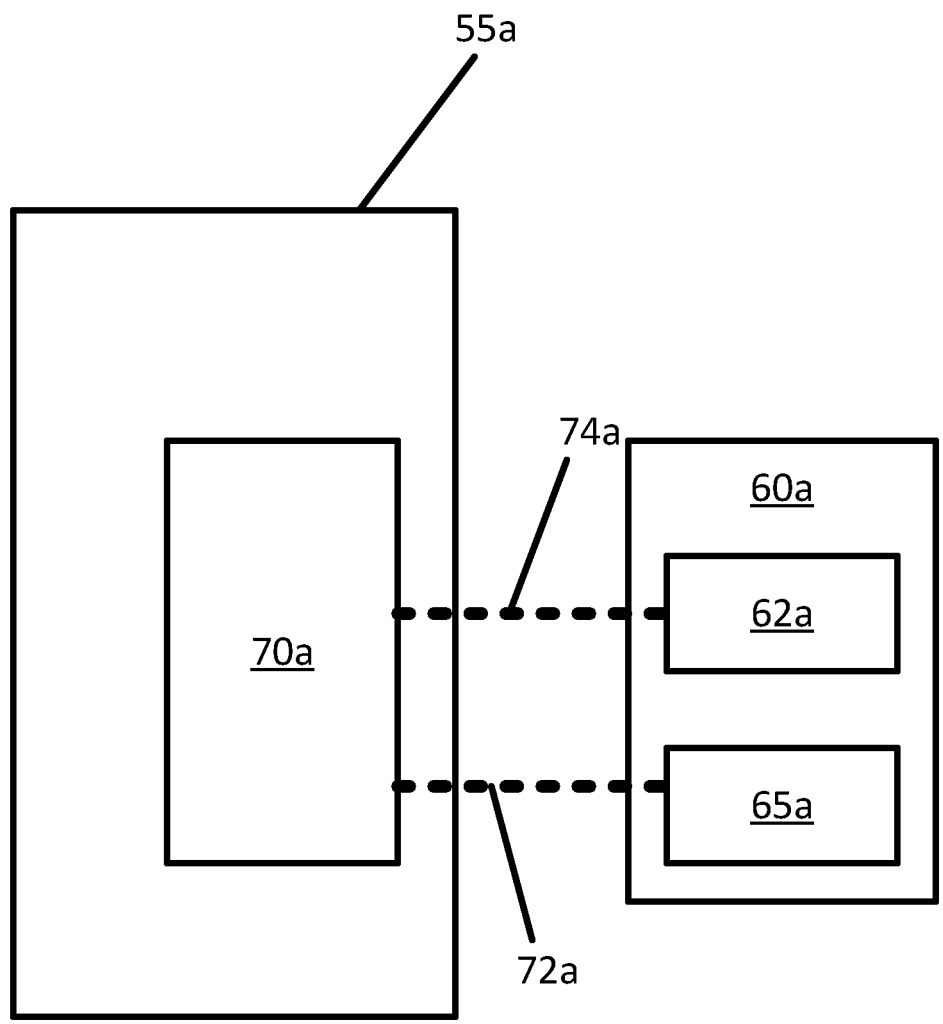
FIG. 3 is a block diagram of another example apparatus.
Figure 3:

Referring to FIG. 3, another example of an apparatus to connect with a wireless network is generally shown at 50a. Like components of the apparatus 50a bear like reference to their counterparts in the apparatus 50, except followed by the suffix "a". In the present example, the apparatus 50a includes a host system 55a, a peripheral device 60a with a network interface 62a, a programmable memory unit 65a, and a power deliver system 70a capable to provide power via a first power rail 72a and a second power rail 74a independently.

The host system 55a is not particularly limited and may be a mobile computing device, such as a laptop computer, a notebook computer, a tablet, a smartphone, or a wearable device. The host system 55a is generally a portable computing device configured to interact with a user. In order to save space within the host system 55a, various systems are removed from the host system 55a. In the present example, the host system 55a does not include a network interface and antenna to communicate with a wireless network.

The peripheral device 60a is in communication with the host system 55a to provide a function for the host system 55a. The function provided by the peripheral device 60a is not particularly limited. Continuing with the present example, the peripheral device 60a may include a network interface and an antenna to allow the host system 55a to connect to a wireless network, such as a WIFI network, a cellular network, BLUETOOTH™, or other non-standard radio signal.

Furthermore, in the present example, the peripheral device 60a includes a unique default identifier, such as a media access control address, that is hardwired into the peripheral device 60a. Accordingly, the use of the peripheral device 60a without any configuration changes causes the peripheral device 60a to identify itself over a network with the default identifier. It is to be appreciated that the default identifier of the peripheral device 60a may not be associated with the host system 55a. Accordingly, the default identifier of the peripheral device 60a does not identify the host system 55a to other devices via a connection through the peripheral device 60a.

In the present example, the peripheral device 60a includes an accessory, such as a network interface 62a to communicate with an external network, and a programmable memory unit 65a to store a configuration profile. The network interface 62a is not particularly limited and may be any interface capable to send and to receive messages over a network. In the present example, it may be assumed that the network interface 62a is a WIFI network interface via 802.11a, 802.11g, 802.11n, or 802.11ac standards.

The programmable memory unit 65a is a non-volatile memory unit, such as Electrically Erasable Programmable Read Only Memory in the present example. The configuration profile sent to the programmable memory unit 65a may be used to re-configure the peripheral device 60a as an embedded device of the host system 55a. The manner by which the peripheral device 60a is re-configured is not particularly limited and may include methods described above. In the present example, the programmable memory unit 65a may also include information received from the host system 55a to emulate an identifier of the host system 55a, such as the media access control address of the host system. Accordingly, after the peripheral device 60a has been re-configured with configuration profile provided by the host system 55a, the peripheral device 60a may identify itself with the identifier provided in the configuration profile instead of the default identifier.

The configuration profile is not particularly limited and may include data to override default settings of the peripheral device 60a. In the present example, the configuration profile includes an identifier of the host system 55a, such as the media access control address. When the peripheral device 60a overrides and bypasses the default settings, external devices do not see any information about the peripheral device 60a and instead view the apparatus 50a as the host system 55a with an embedded device.

The power deliver system 70a is to provide power to the components of the peripheral device 60a. In the present example, the power delivery system 70a includes a first power rail 72a in communication with the programmable memory unit 65a, and a second power rail 74a in communication with the network interface 62a. The power delivery system 70a is to deliver power separately to the network interface 62a of the peripheral device 60a and the programmable memory unit 65a.

The power delivery system 70a may be controlled by the host system 55a such that power may be selectively provided to the network interface 62a of peripheral device 60a or to the programmable memory unit 65a. In particular, the power delivery system 70a may selectively turn on the programmable memory unit 65a via the first power rail 72a and not provide power to the network interface 64a of the peripheral device 60a. When power is provided solely to the programmable memory unit 65a, the programmable memory unit 65a may receive the configuration profile from the host system 55a while the second power rail 74a is turned off such that the peripheral device 60a does not interact with any other devices, such as over the network. Therefore, the programmable memory unit 65a may re-configure the peripheral device 60a to bypass the default settings of the peripheral device 60a before any interactions with external devices. Once the peripheral device 60a is re-configured, the second power rail 74a may be turned on to boot the peripheral device 60a to operate as an embedded device.

It is to be appreciated that variations are contemplated. For example, the peripheral device 60a may not be hardwired to the host system 55a and instead connected with a wireless data connection. Accordingly, the power delivery system 70a may not provide power to the peripheral device 60a, but instead control the power rails within the peripheral device to allow for the host system 55a to send a configuration profile the programmable memory unit 65a prior to powering up the peripheral device 60a.

Figure 4:
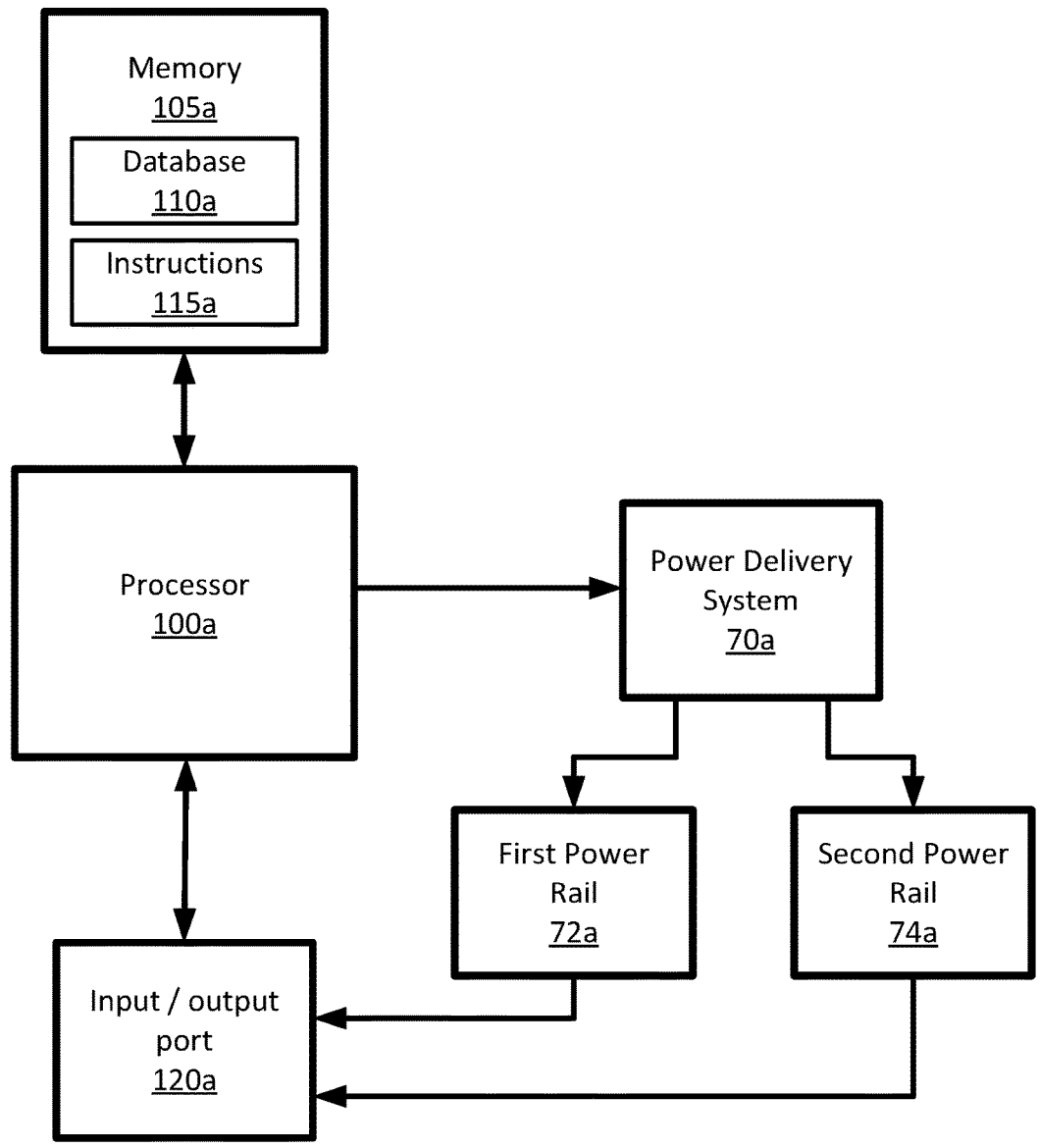
FIG. 4 is a block diagram of another example host system.

Referring to FIG. 4, an example of components of the host system 55a is shown in greater detail. Like components of the host system 55a bear like reference to their counterparts in the host system 55, except followed by the suffix "a". In the present example, the host system 55a includes the power delivery system 70a to deliver power via a first power rail 72a and via a second power rail 74a, a processor 100a, a memory 105a, and an input/output port 120a. The processor 100a may be to operate the host system 55a to carry out various functions typical of a computing device. The specific functions of the host system 55a may be dependent on an application of the host system.

As shown in FIG. 4, the power delivery system 70a is to deliver power via a first power rail 72a and a second power rail 74a to the input/output port 120a. The first power rail 72a and the second power rail 74a each provide power independently to different components. In the present example, the first power rail 72a and the second power rail 74a deliver power from the power delivery system 70a to the input/output port 120a where the power may be delivered to components of the peripheral device 60. In other examples, the first power rail 72a and the second power rail 74a may deliver power from separate power sources, such as independent power delivery systems.

Figure 5:
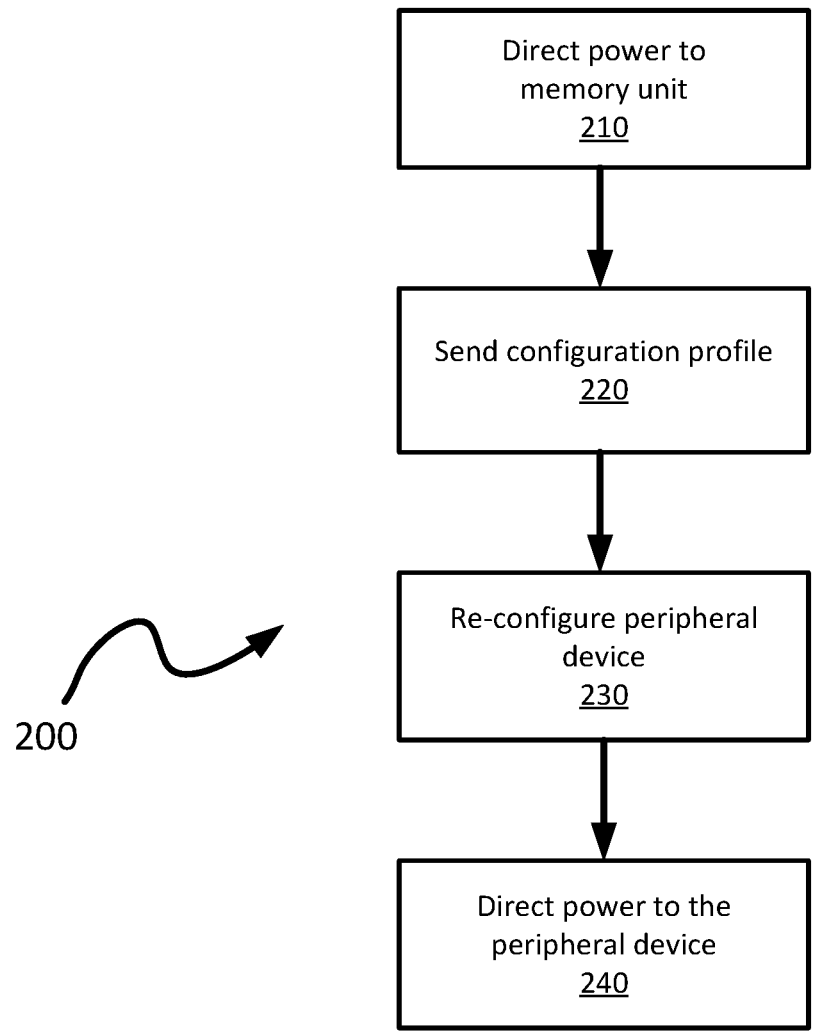
FIG. 5 is a flowchart of an example of a method.

Referring to FIG. 5, a flowchart of a method to configure a peripheral device connected to a host system is shown at 200. In order to assist in the explanation of method 200, it will be assumed that method 200 may be performed with the apparatus 50 or the apparatus 50a, and specifically by the processor 100. Indeed, the method 200 may be one way in which apparatus 50 or the apparatus 50a may be configured. Furthermore, the following discussion of method 200 may lead to a further understanding of the processor 100, and apparatus 50 or the apparatus 50a and their various components. Furthermore, it is to be emphasized, that method 200 need not be performed in the exact sequence as shown, and various blocks may be performed in parallel rather than in sequence, or in a different sequence altogether.

Beginning at block 210, the processor 100a directs power to the programmable memory unit 65a. The manner by which power is directed is not limited. For example, the power may be directed from the power delivery system 70a via the first power rail 72a and the input/output port 120a.

In this example, the power deliver system 70a effectively uses a direct connection to the programmable memory unit 65a to supply power to the programmable memory unit 65a while the network interface 62a does not receive any power and remains in a non-powered state. Accordingly, since the network interface 62a does not have any power, it does not perform any functions such as exchange messages over a network or connect to the network.

Block 220 involves the host system 55a to send a configuration profile to the programmable memory unit 65a for storage. The manner by which the host system 55a sends the configuration profile is not particularly limited. In the present example, a data connection between the peripheral device 60a and the host system 55a may be used to transfer data. Accordingly, the host system 55a may receive the default identifiers from the peripheral device 60a. The default identifiers may be used by the processor 100a to obtain a configuration profile from the database 110a associated with the peripheral device 60a.

Next, block 230 re-configures the peripheral device 60a to emulate an embedded device of the host system 55a. In particular, the programmable memory unit 65a is populated with information included in the configuration profile received from the host system 55a to be used identifier of the host system 55a, such as the media access control address. Accordingly, after the peripheral device 60a has been re-configured with configuration profile provided by the host system 55a, the peripheral device 60a may subsequently identify itself as part of the host system 55a.

Block 240 directs power to an accessory of the peripheral device 60a, such as the network interface 62a. Since the peripheral device 60a is re-configured to emulate an embedded device of the host system 55a, the peripheral device 60a will function as an embedded device of the host system 55a when powered up. In particular, block 240 may power the accessory of the peripheral device 60a, such as the network interface 62a, after a short delay, such as for a predetermined period of time, to allow for the re-configuration in block 230 to be completed such that when the network interface 62a is turned on, the peripheral device 60a does not identify itself over the network with the default identifiers.

Various advantages will now be apparent to a person of skill in the art. For example, when the programmable memory unit 65a of the peripheral device 60a is programmed prior to the remainder of the peripheral device 60a being powered, the peripheral device 60a may immediately join a network and identify itself as part of the host system 55a. Without the independent control of power to various components of the peripheral device 60a, the entire peripheral device 60a is powered up simultaneously. Accordingly, the peripheral device 60a will identify itself on the network with the default identifiers instead of data from the configuration profile. Once the data from the configuration profile is loaded, the peripheral device 60a may need to be restarted to reconnect with the network. Accordingly, the above method provides a way to connect peripheral devices to a host system that emulate the host system and reduces the instances of network errors. In particular, the apparatus 50 or 50a may be advantageous for environments where the apparatus may connect with many peripherals, such as in workplaces with floating work spaces or where the apparatus is used in multiple locations within workplace, such as a desk and in a meeting room.

It should be recognized that features and aspects of the various examples provided above may be combined into further examples that also fall within the scope of the present disclosure.

What is claimed is:

1. An apparatus comprising:
   a host system;
   a peripheral device in communication with the host system;
   a programmable memory unit within the peripheral device, wherein the programmable memory unit is to receive a configuration profile from the host system, the configuration profile to re-configure as an embedded device; and
   a power delivery system to provide power to the programmable memory unit and to provide power to an accessory of the peripheral device separately, wherein the power delivery system provides power to the programmable memory unit to allow re-configuration of the peripheral device as the embedded device.

2. The apparatus of claim 1, wherein the peripheral device includes a first power rail to provide power to the programmable memory unit and a second power rail to provide power to the accessory.

3. The apparatus of claim 2, wherein the first power rail is to be turned on to allow the programmable memory unit to receive the configuration profile when the second power rail is turned off.

4. The apparatus of claim 3, wherein the second power rail is to be turned on to boot the peripheral device as the embedded device.

5. The apparatus of claim 1, wherein the peripheral device is a network interface.

6. A non-transitory machine-readable storage medium encoded with instructions executable by a processor, the non-transitory machine-readable storage medium comprising:
   instructions to direct power solely to a programmable memory unit of a peripheral device;
   instructions to send a configuration profile from a host system to the programmable memory unit for storage;
   instructions to re-configure the peripheral device as an embedded device of a host system; and
   instructions to direct power to the peripheral device completely from a power delivery system such that the peripheral device functions as the embedded device of the host system.

7. The non-transitory machine-readable storage medium of claim 6, wherein the instructions to direct power solely to a programmable memory unit uses a first power rail to provide power to the programmable memory unit.

8. The non-transitory machine-readable storage medium of claim 7, wherein the instructions to direct power to the peripheral device completely uses the first power rail and a second power rail to provide power to an accessory.

9. The non-transitory machine-readable storage medium of claim 8, comprising instructions to turn on the first power rail for a predetermined period of time prior to use of the second power rail to provide power.

10. The non-transitory machine-readable storage medium of claim 9, wherein the predetermined period of time is sufficient to re-configure the peripheral device.

11. The non-transitory machine-readable storage medium of claim 10, comprising instructions to boot the peripheral device as the embedded device.

12. A method comprising:
directing power with a first power rail to a programmable memory unit of a peripheral device;
sending a configuration profile from a host system to the programmable memory unit for storage;
re-configuring the peripheral device as an embedded device of a host system; and
directing power with a second power rail to an accessory of the peripheral device such that the peripheral device functions as the embedded device of the host system.

13. The method of claim 12, further comprising controlling the first power rail and the second power rail via a power delivery system.

14. The method of claim 13, comprising activating the first power rail for a predetermined period of time prior to activation of the second power rail.

15. The method of claim 13, comprising re-configuring the peripheral device during a period of time.

* * * * *